US008057655B1

(12) United States Patent
Cohen et al.

(10) Patent No.: US 8,057,655 B1
(45) Date of Patent: Nov. 15, 2011

(54) SUB-MICRON OBJECT CONTROL ARRANGEMENT AND APPROACH THEREFOR

(75) Inventors: Adam E. Cohen, Stanford, CA (US); William E. Moerner, Los Altos, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1211 days.

(21) Appl. No.: 11/207,593

(22) Filed: Aug. 19, 2005

Related U.S. Application Data

(60) Provisional application No. 60/603,297, filed on Aug. 20, 2004.

(51) Int. Cl.
*G01N 27/26* (2006.01)

(52) U.S. Cl. ............ 204/643; 204/547; 204/450; 435/4; 435/6; 435/286.1; 435/173.9; 422/50; 436/63; 436/43; 356/338; 356/450; 250/251; 250/282

(58) Field of Classification Search .................. 382/128, 382/133; 204/450, 500, 547, 643; 435/4, 435/6, 286.1, 173.9; 422/50; 436/63, 43; 356/338, 450; 250/251, 282
See application file for complete search history.

(56) References Cited

U.S. PATENT DOCUMENTS 4,092,535 A 5/1978 Ashkin et al.
5,512,745 A 4/1996 Finer et al.
5,578,460 A * 11/1996 Ebersole et al. ................ 435/29
5,720,928 A * 2/1998 Schwartz ...................... 422/186
5,750,015 A * 5/1998 Soane et al. .................. 204/454
6,221,654 B1 4/2001 Quake et al.
6,344,325 B1 2/2002 Quake et al.
6,388,249 B2 * 5/2002 Wakiyama et al. ........... 250/234
6,498,863 B1 * 12/2002 Gaidoukevitch et al. ..... 382/173
6,515,649 B1 * 2/2003 Albert et al. .................. 345/107
6,537,433 B1 * 3/2003 Bryning et al. ............... 204/450
6,540,895 B1 4/2003 Spence et al.
6,969,454 B2 * 11/2005 Bryning et al. ............... 204/601
7,033,476 B2 * 4/2006 Lee et al. ...................... 204/603
2001/0002315 A1 * 5/2001 Schultz et al. ................ 436/172
2003/0150727 A1 * 8/2003 Mathies et al. ............... 204/452
2003/0165960 A1 * 9/2003 Kopf-Sill et al. ................. 435/6
2003/0215863 A1 * 11/2003 Chow et al. ........................ 435/6
2005/0051429 A1 3/2005 Shapiro et al.

FOREIGN PATENT DOCUMENTS

DE 195 00 683 A1 * 6/1996
WO WO 97/34689 * 9/1997

OTHER PUBLICATIONS

Groves et al., Micropattern Formation in Supported Lipid Membranes, ACS, vol. 35, No. 2, 2002, pp. 149-157.*

(Continued)

*Primary Examiner* — Jeffrey T Barton
*Assistant Examiner* — Jennifer Dieterle
(74) *Attorney, Agent, or Firm* — Crawford Maunu PLLC

(57) ABSTRACT

Sub-micron objects are manipulated. According to an example embodiment of the present invention, Brownian motion effects are mitigated to facilitate the analysis and/or manipulation of sub-micron objects. In some applications, an electric field is applied to facilitate the manipulation of sub-micron objects in solution, facilitating the analysis of the manipulated objects. In other applications, fluid flow is used to effect the manipulation of sub-micron objects in solution.

10 Claims, 12 Drawing Sheets

OTHER PUBLICATIONS

Delgado et al. (Imaging of submicron objects with the light microscope, Journal of Microscopy, vol. 154, pt. 2, May 1989, pp. 129-141).*

Acousto-Optic article (The Acousto-Optic Modulator and Optical Heterodyning, Department of Physics, Middlebury College, 1992-93, pp. 1-12).*

Muller et al. (Biosensors & Bioelectronics, 14, 1999, pp. 247-256).*

Translation: Fuhr, Trapping Molecules and Microparticles in Field Cages, DE 195 00 683 A1, 1994.*

Tanada, Proceedings, Hawaiian Entomological Society, 1955.*

Charlie Gosse et al., "Magnetic Tweezers: Micromanipulation and Force Measurement at the Molecular Level," *Biophysical Journal*, vol. 82, Jun. 2002, pp. 3314-3329.

J. Gaudioso et al., "Characterizing Electroosmotic Flow in Microfluidic Devices," *Journal of Chromatography A*, 971, Jun. 2002, pp. 249-253.

Peter R. C. Gascoyne, "Dielectrophoresis-Based Sample Handling in General-Purpose Programmable Diagnostic Instruments," Proceedings of the IEEE, vol. 92, No. 1, Jan. 2004, pp. 22-42.

Sep. 2000, J. Enderlein, "Tracking of Fluorescent Molecules Diffusing Within Membranes," *Applied Physics B.*, 71, pp. 773-777.

Robert M. Dickson et al., "Three-Dimensional Imaging of Single Molecules Solvated in Pores of Poly (acrylamide) Gels," *Science*, New Series, vol. 274, No. 5289, Nov. 8, 1996, pp. 966-969.

Detlev Belder et al., "Poly(vinyl alcohol)-coated microfluidic devices for high-performance microchip electrophoresis," *Electrophoresis*, vol. 23, 2002, pp. 3567-3573.

Detlev Belder et al., "Surface modification in microchip electrophoresis," *Electrophoresis*, vol. 24, 2003, pp. 3595-3606.

A. Ashkin et al., "Observation of a single-beam gradient force optical trap for dielectric particles," Optics Letters, vol. 11, No. 5, May 1986, pp. 288-290.

Charlie Gosse et al., "Magnetic Tweezers: Micromanipulation and Force Measurement at the Molecular Level," Biophys J., vol. 82, No. 6, Jun. 2002, pp. 3314-3329 (Abstract only provided).

Joel Voldman et al., "Holding Forces of Single-Particle Dielectrophoretic Traps," Biophys J., vol. 80, Jan. 2001, pp. 531-541.

J. Gaudioso et al., "Characterizing Electroosmotic flow in microfluidic devices," J. Chromatography A., V. 971, Sep. 2002, pp. 249-253. (Abstract only provided).

D. Belder et al., "Surface modification in microchip electrophoresis," Electrophoresis, V. 24 (21), Nov. 2003, pp. 3595-3606. (Abstract only provided).

D. Belder et al., Poly(vinyl alcohol)-coated microfluidic devices for high-performance microchip electrophoresis, Electrophoresis, vol. 23 (20), Oct. 2002, 3567-3573. (Abstract only provided).

Adam E. Cohen, "Control of Nanoparticles with Arbitrary Two-Dimensional Force Fields," Physical Review Letters, 94, Mar. 25, 2005, pp. 118102-1-118102-4.

Adam E. Cohen et al., "Method for trapping and manipulating nanoscale objects in solution," Applied Physics Letters, vol. 86, 093109, Feb. 28, 2005, 3 pages.

Adam E. Cohen et al., "The Anti-Brownian Electrophoretic Trap (ABEL Trap): Fabrication and Software," Proc. SPIE, vol. 5699 (293), 2005, 10 pages.

Robert Dickson et al., "Three-Dimensional Imaging of Single Molecules Solvated in Pores of Poly(acrylamide) Gels," Science, vol. 274, No. 5289, Nov. 8, 1996, pp. 966-968. (Abstract only provided).

D. Castelvecchi, "Hold Still," Physical Review Lett. Focus, vol. 94, 118102, Mar. 25, 2005, 3 pages.

Y. Carts-Powell, "Building a Better Molecule Trap," Science Now, Feb. 18, 2005, 2 pages.

J. Enderlein, "Tracking of fluorescent molecules diffusing within membranes," Appl. Phys. B Lasers and Optics, V. 71, Issue 5, 2000, pp. 773-777. (Abstract only provided).

T. Dertinger et al., Advanced multifocus confocal laser scanning microscope for single molecule studies, Proc. SPIE, vol. 5699, Mar. 2005, 219-226. (Abstract only provided).

Andrew Berglund et al., "Tracking-FCS: Fluorescence correlation spectroscopy of individual particles," Oct. 3, 2005, vol. 13, No. 20, Oct. 3, 2005, pp. 8069-8082.

Valeria Levi et al., "3-D Particle Tracking in a Two-Photon Microscope: Application to the Study of Molecular dynamics in Cells," Biophysical Journal, vol. 88, Apr. 2005, pp. 2919-2928.

"Editor's Choice: Canceling Brownian Motion," Science, v. 307, Mar. 18, 2005, p. 1694.

Mark Peplow, "Research Highlights: Stop for brownian motion," Nature, v. 434, Mar. 10, 2005, p. 156.

* cited by examiner

SUB-MICRON OBJECT CONTROL ARRANGEMENT AND APPROACH THEREFOR

RELATED PATENT DOCUMENTS

This patent document claims benefit under 35 U.S.C. §119 (e) to U.S. Provisional Patent Application No. 60/603,297, entitled "Method and Apparatus for Trapping Molecular Objects," filed on Aug. 20, 2004.

FIELD OF THE INVENTION

The present invention relates generally to controlling objects, and in particular aspects, to trapping and/or manipulating sub-micron objects in a fluid.

BACKGROUND

The development of electrical, mechanical, biological and other devices has seen dramatic achievements in the implementation of ever-smaller objects and arrangements. In many applications, atomic, molecular or macromolecular arrangements having dimensional characteristics of a relatively small size (e.g., less than 100 nanometers) have seen increased development and implementation. These arrangements are often manufactured, manipulated or otherwise controlled on an atomic scale. Technological areas involving such small-scale objects are often referred to as those areas pertaining to nanotechnology.

One aspect of nanotechnologies that has been challenging relates to the ability to control and/or manipulate sub-micron (e.g., nanoscale) objects. For instance, isolating, orienting, translating or otherwise processing sub-micron objects for analysis and other purposes has been particularly challenging. Where small objects are in fluid solution such as a liquid or gas, Brownian motion of the objects (thermally-driven motion related to collisions of the objects with other molecules in solution) also poses problems to analyzing the objects. At room temperature, Brownian motion is quite large for small objects (mean square displacement per unit time scaling inversely with the diameter).

Previous approaches to manipulating small-scale objects have involved the use of laser tweezers, such as described in A. Ashkin, J. M. Dziedzic, J. E. Bjorkholm, and S. Chu, *Observation of a Single-Beam Gradient Force Trap for Dielectric Particles*, Opt. Lett. 11, 288 (1986). Magnetic tweezers have also been used to trap and manipulate micron-scale objects. See, e.g., C. Gosse and V. Croquette, "Magnetic tweezers: micromanipulation and force measurement at the molecular level," *Biophys. J.* 82, 3314 (2002). Other approaches have involved AC dielectrophoresis, which have been used to trap micrometer-scale objects (see, e.g., P. R. C. Gascoyne and J. V. Vykoukal, *Dielectrophoretic Concepts for Automated Diagnostic Instruments*, Proc. IEEE 92, 22 (2004); J. Voldman, R. A. Braff, M. Toner, M. L. Gray, and M. A. Schmidt, *Holding Forces of Single-Particle Dielectrophoretic Traps*, Biophys. J. 80, 531 (2001); and T. B. Jones, *Electromechanics of Particles*, (Cambridge University Press, New York, 1995)).

While useful in certain aspects, trapping very small objects with the above (and other) previously-used approaches has been challenging. For example, with laser tweezers, magnetic tweezers and approaches based on dielectrophoresis, the maximum force available for trapping an object is generally proportional to the object's volume. In this regard, trapping sub-micron objects, and in particular, trapping objects much less than one micron in cross-section has been particularly challenging due to the scaling of the force available to trap such small objects. Moreover, for much smaller objects, heat-generating trapping approaches such as that associated with the laser power required to trap particles with laser tweezers can cause heating and photochemistry, both of which may disrupt the function of polymers or sensitive biological molecules such as delicate enzymes. Approaches based on magnetic interactions suffer from lack of generality, because the object to be trapped must be magnetic, and magnetic forces are generally small for all but a few materials, limiting the application of such approaches.

The above and other issues have presented challenges to the manipulation of small particles, and in particular to the manipulation and use of sub-micron objects.

SUMMARY

The present invention is directed to approaches to manipulating and analyzing small (e.g., sub-micron) objects. The present invention is exemplified in a number of implementations and applications, some of which are summarized below.

According to an example embodiment of the present invention, sub-micron objects are manipulated and analyzed using an electrokinetic trapping approach. One implementation involves trapping an individual sub-micron particle such as a biomolecule, and in some instances, positioning the trapped particle.

In another example embodiment of the present invention, motion of a fluid-born sub-micron object is controlled by detecting the motion and applying an electrokinetic force to the sub-micron object as a function of the detected motion. In some applications, the motion is detected by repeatedly capturing images of the sub-micron object, with the repeatedly detected motion used to apply and, as appropriate, adjust the electrokinetic force (e.g., at a rate commensurate with the rate that the images are captured).

In another example embodiment, a system controls a fluid-born sub-micron object. The system includes an optics arrangement that detects motion of the sub-micron object. An electrical arrangement applies an electrokinetic force to the sub-micron object as a function of the detected motion, thereby mitigating motion of the sub-micron object.

Another example embodiment is directed to a trapping approach involving an anti-Brownian electrokinetic trap arrangement. Sub-micron objects are dissolved in a liquid such as water or another solvent. The sub-micron objects in solution are imaged optically and the images are used to track the motion of the objects (e.g., to track random Brownian motion of the objects). Using the tracked motion, feedback is supplied to electrokinetic trapping electrodes in a manner that counters the tracked motion by applying an electrokinetic force to the tracked object or objects (e.g., by applying a voltage that facilitates electrophoretic drift and/or electroosmotic flow that counters Brownian motion). This electrokinetic force is predominantly one or both of an electrophoretic or an electroosmotic force. Where appropriate, the feedback is selectively implemented to manipulate an object to a selected position via the electrokinetic force.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
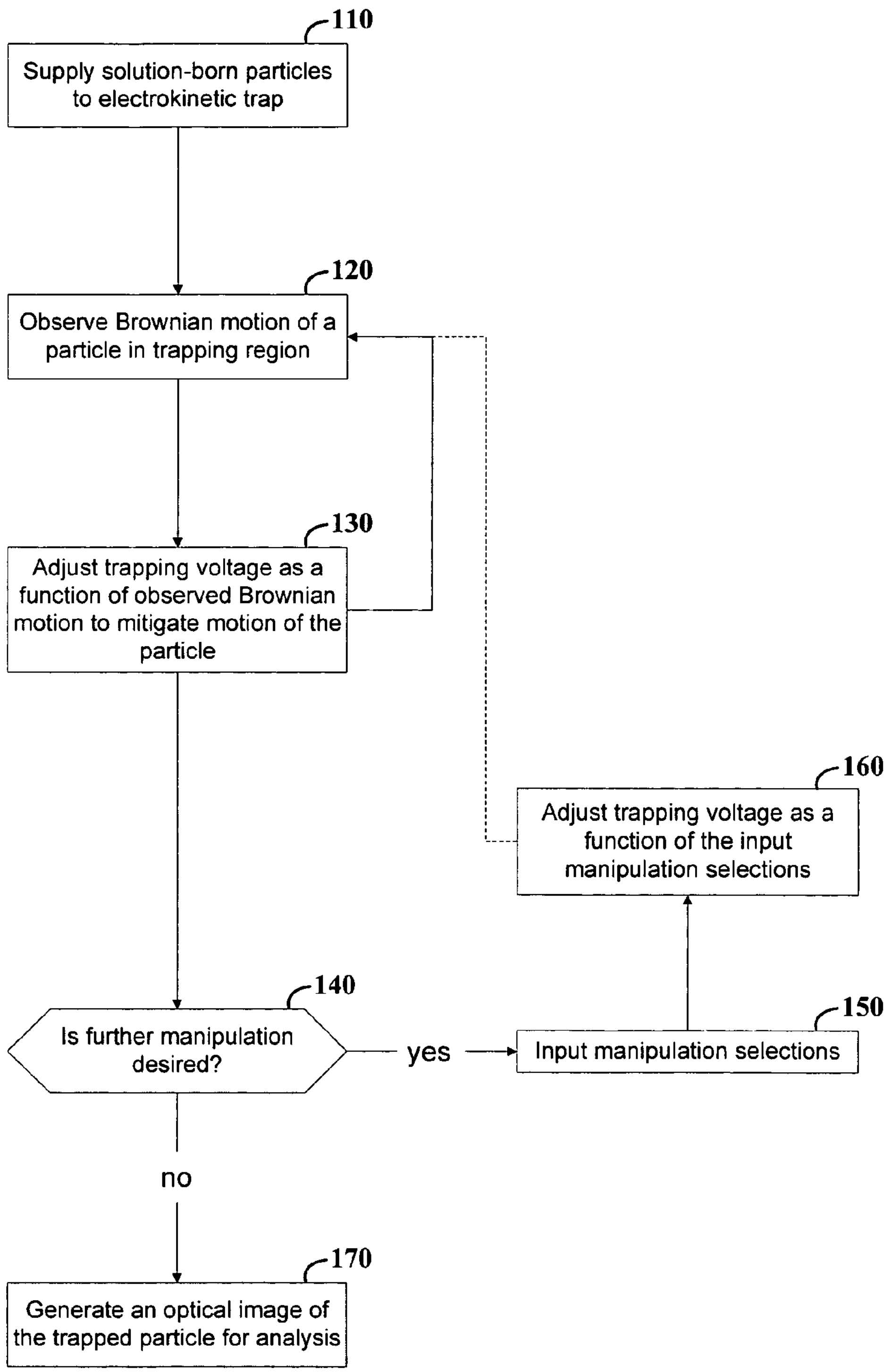
FIG. 1 is a flow diagram of an approach to manipulating solution-born particles, according to an example embodiment of the present invention.

While the invention is amendable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different types of analysis, and the invention has been found to be particularly suited for trapping molecular-sized objects and, in some instances, positioning the trapped object or objects. Various example embodiments described herein provide examples of the present invention as applied to manipulating particles having relatively small dimensions (e.g., of a cross-section at a sub-micron particle's widest point and, in some instances, at a nanometer-scale particle's widest point). Further, particles, molecules, objects or other terms can be or are used to refer to the subject of various trapping approaches herein; these approaches are accordingly applicable to a variety of subjects including those discussed as particles, molecules, objects and in other appropriate terms. While the present invention is particularly useful for such applications, these below-discussed embodiments do not necessarily limit the present invention to these applications.

These and other aspects of the present invention are exemplified in a number of implementations and applications, some of which are shown in the figures and characterized in the claims section that follows.

According to an example embodiment of the present invention, one or more sub-micron objects (e.g., nano-sized objects in a fluid or gas) are trapped and positioned using an electrokinetic force via a set of electrodes configured to mitigate and selectively cancel the motion (e.g., thermal Brownian motion) of the sub-micron object(s). In one implementation, motion of a sub-micron object is tracked using an imaging approach. Using the tracked motion, a feedback arrangement applies voltage to electrodes to generate an electrokinetic force that is predominantly one or both of an electrophoretic or an electroosmotic force. In some applications, the feedback arrangement includes a feedback processing circuit implemented in connection with a computer and a special-purpose computer program.

In certain applications where electrophoresis is implemented, the electrokinetic force facilitates an electrophoretic drift that cancels the Brownian motion of an object in solution, facilitating the trapping and/or manipulation of the object. In applications involving electroosmosis, the electrokinetic force is used to manipulate fluid flow in the vicinity of a sub-micron object, thereby trapping and/or manipulating the sub-micron object (or objects).

In the context of various example embodiments and implementations, the term electrokinetic refers generally to the relative motions of species in connection with an electric field. In some applications, the motions may be either of charged, dispersed species or of the continuous phase. Many applications involve the application of an externally-applied electric field; certain applications may, however, involve an electric field created by the motions of the dispersed or continuous phases. In this regard, and according to the present invention, various examples shown as or described in connection with an electrophoretic approach may be implemented with an electroosmotic approach, and vice-versa.

In electrokinetic applications involving both electrophoresis and electroosmosis, the relative contributions of electrophoretic and electroosmotic forces to the total velocity of a particle are controlled using one or more of a variety of approaches. In the case of electrophoretic contributions, the electrophoretic velocity produced by an applied electric field is proportional to the charge on the particle and inversely proportional to the viscosity of the solution in which the particle resides. In the case of electroosmotic applications, force is applied generally independent from the charge of the particle, with the electroosmotic velocity produced by an applied electric field depending upon the charge on the channel walls (via a quantity called the "zeta-potential") containing the solution and is inversely proportional to the viscosity of the solution in the vicinity of the walls.

The charge on the channel walls relates to the material composition of the walls, the pH of the solution, the ionic strength of the solution, and the adsorption of species from solution. In various embodiments, adsorbed polymers are used to increase the viscosity in the vicinity of the walls, thereby decreasing the electroosmotic velocity. In other certain applications, compounds used to selectively reduce or eliminate electroosmotic flow (by application to selected areas of the walls) include one or more of POP-6 (available from Applied Biosystems of Foster City, Calif.), cellulose derivatives, poly (vinyl alcohol) or another adsorbed polymer that increases the viscosity and/or alters the charge in the vicinity of the walls.

For general information regarding electrokinetic approaches such as electroosmosis and electrophoresis, and for particular information regarding approaches to adjusting the relative strengths of electroosmotic and electrophoretic forces as may be applicable to various example embodiments of the present invention, reference may be made to J. Gaudioso and H. G. Craighead, "Characterizing electroosmotic flow in microfluidic devices," *J Chromatography A*, v. 971 p. 249-253 (2002); D. Belder and M. Ludwig, "Surface modification in microchip electrophoresis," *Electrophoresis, v.* 24 p. 3595-3606 (2003); D. Belder, A. Deege, F. Kohler, and M. Ludwig, "Poly(vinyl alcohol)-coated microfluidic devices for high-performance microchip electrophoresis," *Electrophoresis, v.* 23p. 3567-3573 (2002), all of which are fully incorporated herein by reference.

Another example embodiment of the present invention is directed to an anti-Brownian electrokinetic trap including an optical arrangement adapted to facilitate the measurement of the Brownian motion of an object, and an electrical arrangement (e.g., a set of electrodes) adapted to generate an electrophoretic drift that mitigates the Brownian motion. In certain applications, the Brownian motion of a charged object is canceled via the generated electrophoretic drift. When implemented with objects immersed in water (e.g., deionized or buffered water), the electrical arrangement applies a voltage to electrodes that causes the charged object to move along lines of the electric field (i.e., causes electrophoresis).

A variety of geometries are selectively implemented with the electrokinetic trapping approaches discussed herein. These geometries include, for example, different arrangements of a set of electrodes and/or where appropriate, different fluid-containing arrangements. In one implementation, electrodes are located on a glass coverslip (e.g., formed using a photolithography approach), with fluid containment implemented to confine a solution of objects to be trapped to a thin liquid layer above the electrodes. The electrodes are separated by about 20 microns, and a liquid layer of about 1.5 microns in depth is maintained over the electrodes. When coupled to an appropriate electric source, the electrodes apply a voltage that applies an electrokinetic force that traps and/or manipulates sub-micron objects in the thin liquid layer.

In some example embodiments, particles exhibiting fluorescence such as polystyrene nanospheres with imbedded fluorescent dye molecules are controlled and trapped for analysis. A sample-cell including particles in solution is mounted in a fluorescence microscope equipped with an imaging device such as a high-sensitivity charge-coupled device (CCD) camera. An excitation source such as a laser beam or a lamp is used to excite the fluorescence of the particles to generate an emission image, which is captured and sent to a processing circuit for analysis and, where appropriate, tracking of the motion of individual particles in real time. Where tracking is implemented, a feedback circuit changes voltages applied to the electrodes to mitigate and/or cancel the Brownian motion of a particle, and to keep the particle at a target position for analysis. Using these approaches to control the motion of particles, the particles are readily imaged using, e.g., a camera or other arrangement with display of the image for visual analysis. In some applications, these approaches are supplemented for controlling the orientation of a trapped particle, such as by applying high-frequency AC fields to the electrodes.

In another example embodiment, a trapped object is manipulated in response to user inputs. For example, where a particle is trapped and displayed in an image as discussed above, a user viewing the image can input selections for moving the trapped particle. In response to the input selections, the voltage applied to the electrodes is altered to effect movement of the trapped particle in a manner indicated by the user input selections. For instance, where a user inputs selections by dragging (i.e., using a computer mouse or other pointing device) the image of the trapped particle, the actual trapped particle follows the same trajectory, but on a much smaller scale (e.g., some 10,000 times smaller). As another example, a user may input a selection for a predetermined trajectory for the trapped particle to follow, with the voltage accordingly applied to facilitate the movement of the particle in the predetermined trajectory.

In some applications, a single freely diffusing object in solution is trapped while other objects in the solution are allowed to continue to diffuse or otherwise move. This approach utilizes the statistically independent nature of the Brownian motion of distinct freely diffusing objects, such that the mitigation of Brownian motion in one object generally does not concurrently mitigate Brownian motion in other objects. With this approach, the imaging of trapped objects is facilitated in the context of discriminating the trapped objects from background objects and/or solution (e.g., using an optical detection scheme such as fluorescence, scattering, or absorption).

For general information regarding approaches to analyzing particles, and for specific information regarding control approaches that may be implemented in connection with various example embodiments, reference may be made to Adam E. Cohen, "Control of Nanoparticles with Arbitrary Two-Dimensional Force Fields," *Physical Review Letters* 94, 118102 (2005); to Adam E. Cohen and W. E. Moerner, "Method for Trapping and Manipulating Nanoscale Objects in Solution," *Applied Physics Letters* 86, 093109, (2005); and to A. E. Cohen, W. E. Moerner, "The Anti-Brownian Electrophoretic trap (ABEL trap): fabrication and software," *Proc. SPIE* 5699, 293 (2005) which are fully incorporated herein by reference.

Figure 2A:
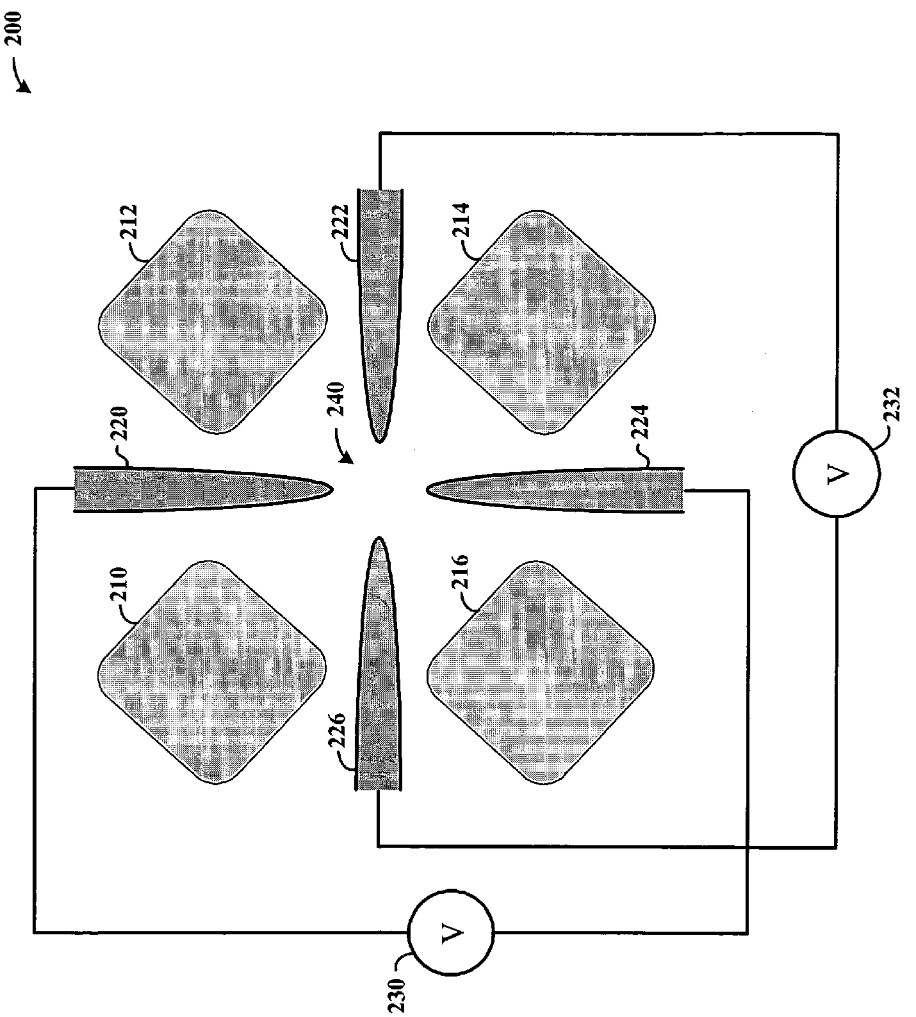
FIG. 2A shows a top-down view of an electrophoretic trap arrangement, according to another example embodiment of the present invention.

Turning now to the Figures, FIG. 1 shows a flow diagram for an approach to trapping and analyzing solution-born particles, according to another example embodiment of the present invention. The approach shown in FIG. 1 is applicable to electrophoretic and electroosmotic trapping approaches; example arrangements to which these approaches are selectively applied are shown in FIG. 2A and in FIG. 2B.

At block 110, a solution having solution-born particles is supplied to an electrokinetic trap. At block 120, Brownian motion of a particle in a trapping region of the electrokinetic trap is observed using an imaging approach. Trapping voltages applied to the electrodes are adjusted at block 130 as a function of the observed Brownian motion to mitigate motion of the trapped particle, the trapping voltages facilitating the trapping of a particle from the solution in a trapping region served by the electrodes. The observation of Brownian motion and corresponding adjustment of trapping voltage(s) at blocks 120 and 130 is repeated at a rate amenable to trapping of the particle, as shown by dashed lines.

If further manipulation of a trapped particle (e.g., movement of the trapping point) is not desired at block 140, such as wherein the trapped particle is sufficiently stable for analysis, an optical image of the particle is generated at block 170, such as via a computer arrangement and display. In some applications, the imaging at block 170 is carried out concurrently with the observation of Brownian motion at block 120.

If further manipulation of the trapped particle is desired at block 140, such as wherein a user wishes to manipulate the particle for better viewing, manipulation selections are input at block 150. In some instances, the manipulation selections input at block 150 are automatically generated by a controller to carry out a predetermined movement of the trapped particle. In other instances, the manipulation selections input at block 160 are manually input by a user wishing to manipulate the trapped particle to a desired position for analysis. A combination of manual and automatic manipulation selections may also be implemented at block 160.

Once manipulation selections are input, the trapping voltage(s) applied to the electrodes is adjusted as a function of the input manipulation selections at block 150. The detection and mitigation of Brownian motion at blocks 120 and 130 is carried out during the application of voltage(s) to manipulate the particle. The process continues at block 140, where a determination is again made as to whether further manipulation is desired.

FIG. 2A shows a top-down view of an electrophoretic trapping arrangement 200, according to another example embodiment of the present invention. While FIG. 2A shows a relatively close-up view of an example electrophoretic trapping arrangement 200, the figures that follow show relatively larger-scale views of example embodiments involving arrangements that are similar to the arrangement 200; the items shown in these figures, such as supporting structure, voltage application circuits and analysis arrangements, can be selectively implemented with the arrangement 200.

The electrophoretic trapping arrangement 200 employs four trapping electrodes 220, 222, 224 and 226 (e.g., on a transparent substrate) that are arranged for applying an electric field to particles in solution in a trapping region 240, and for holding and/or manipulating one or more particles thereat. Four structural arrangements 210, 212, 214 and 216 (e.g., glass or poly-dimethyl siloxane (PDMS)) are arranged as shown between electrodes and facilitate the flow of solution to the trapping region 240. The distance between the electrodes 220, 222, 224 and 226 is selected to facilitate particular application characteristics such as particle size, solution type and others. In some implementations, the electrodes 220, 222, 224 and 226 are arranged at a distance of about 20 microns to facilitate the mitigation of Brownian motion and the manipulation of a particle in solution. Fluid used in the electrophoretic trapping arrangement 200 is confined using, for example, a transparent slide placed on top of the four structural arrangements to produce confinement in the direction perpendicular to the imaging plane (see, e.g., FIG. 7L showing a slide-type arrangement 750).

Voltage is selectively applied to each of the four electrodes 220, 222, 224 and 226 to facilitate the trapping of particles in the trapping region 240, with voltage components 230 and 232 shown by way of example. Examples of external voltage sources/controllers are described below in connection with the other figures. While the potential at each of the electrodes 220, 222, 224 and 226 can be adjusted independently from the other electrodes, equal and opposite voltages are applied to opposing electrodes in certain applications. In some applications, macroscopic electrodes (e.g., copper or stainless steel electrodes) are used to facilitate the flow of sample particle-containing solution into the trapping region 240.

Figure 2B:
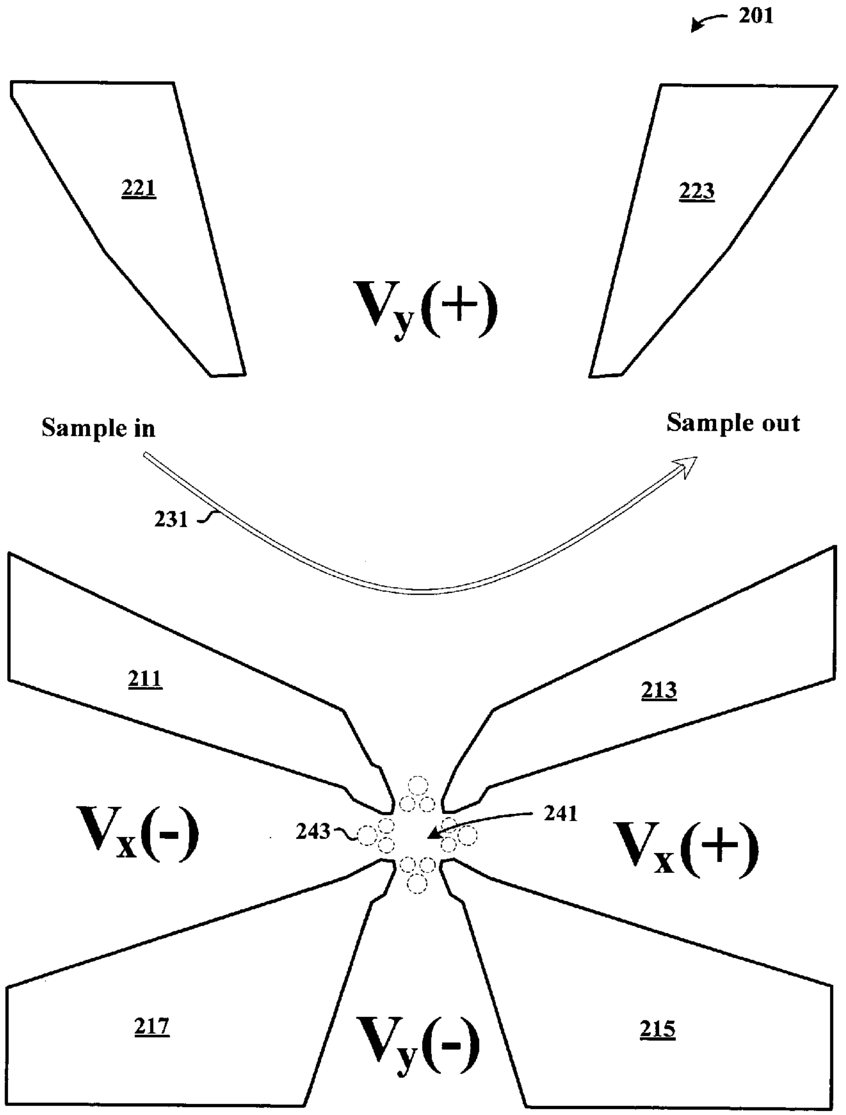
FIG. 2B shows a top-down view of an electroosmotic trap arrangement, according to another example embodiment of the present invention.

FIG. 2B shows an electroosmotic arrangement 201, according to another example embodiment of the present invention. FIG. 2B is similar to FIG. 2A, with fluid flow implemented in channels between impermeable structures 211, 213, 215 and 217, the fluid flow controlled via the application of a voltage to capillaries supplying the fluid. The capillaries are respectively arranged to supply fluid flow from the $V_y(+)$, $V_x(+)$, $V_y(-)$ and $V_x(-)$ directions, relative to a trapping region 241, with sample input and output shown by directional arrow 231. Structures 221 and 223 are barrier structures to confine the flow of sample in and out of the trapping region 241.

The electroosmotic arrangement 201 can be manufactured in a manner similar to that shown in and described with FIGS. 4A-4K for the case where the channels are defined by PDMS walls and barriers, and with FIGS. 7A-7L for the case where the channels are glass walls and barriers. The channels are about 20 μm deep and extend about 7 mm away from the trapping region 241. The trapping region 241 is about 880 nm deep, which facilitates the free diffusion of submicron particles while still confining the particles to the focal plane of a microscope or other imaging device used to capture an image of the trapped particles. In some applications, support posts shown as a set of small circles 243 surrounding the trapping region 241 are optionally implemented to support the arrangement. Similar support posts are selectively implemented near the trapping region 240 in FIG. 2A.

Figure 3A:
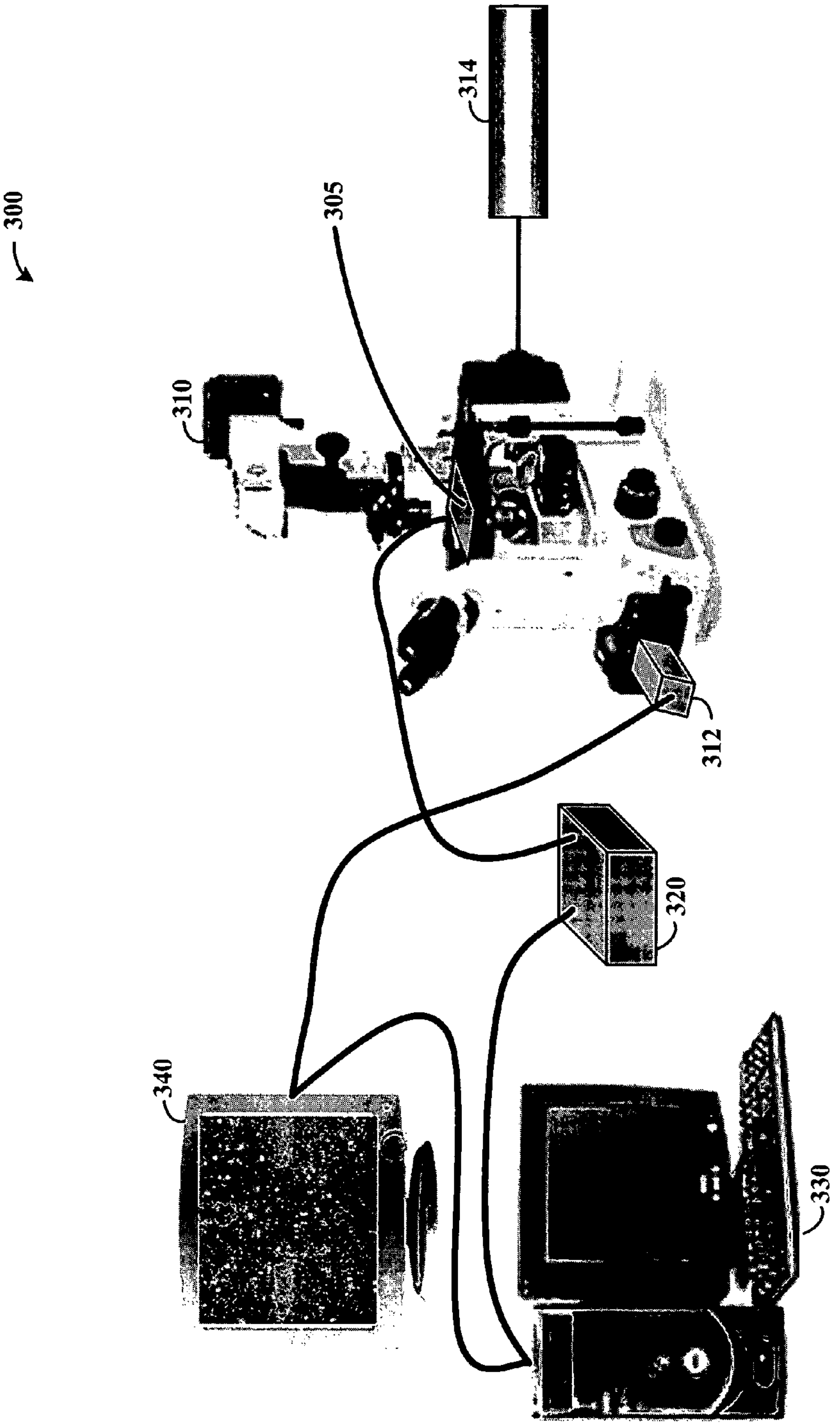
FIG. 3A shows an arrangement for analyzing particles using a microfluidic cell, according to another example embodiment of the present invention.

FIG. 3A shows an arrangement 300 for analyzing particles using a microfluidic cell, according to another example embodiment of the present invention. The arrangement 300 includes a fluorescence microscope 310 having an optical detector 312, such as a Cascade 512B CCD camera available from Roper Scientific or an iXon CCD camera available from Andor Technologies, and a laser source or lamp 314 for illumination. The fluorescence microscope 310 is adapted to hold a microfluidic cell 305 for analysis, with the light source 314 illuminating the microfluidic cell and the optical detector 312 imaging the illuminated microfluidic cell.

Fluorescence image data collected by the optical detector 312 is passed to a monitor 340 and a computer 330. The computer 330 calculates feedback voltages, which are filtered, scaled and/or otherwise processed by an electronic feedback circuit 320. The electronic feedback circuit 320 applies a feedback signal to the microfluidic cell 305 to generate an appropriate electrokinetic drift, e.g., to counter observed Brownian motion of a particle in the microfluidic cell and/or to manipulate a particle as directed via the computer 330 either automatically or manually in response to user inputs.

In one example embodiment, the microfluidic cell 305 implements an electrophoretic trapping arrangement such as that shown in FIG. 2. In this regard, when a particle is trapped in the trapping region 140, light from the laser source 314 is used to illuminate the trapped particle, which is imaged by the optical detector 314. A feedback signal from the feedback circuit 320 is accordingly applied to control voltage across two or more of the electrodes 210, 212, 214 and 216 to effect electrophoretic drift that mitigates or, in some instances, cancels Brownian motion of the trapped particle.

In some applications, the feedback voltage applied to the trapping region 140 via electrodes facilitates the electrophoretic drift by acting directly on a trapped particle's charge. In other applications, the feedback voltage effects an electroosmotic flow that creates a force on the trapped particle to mitigate Brownian motion. Certain applications involve both of these approaches, such that the feedback voltage acts directly upon a trapped particle's charge and further effects an electroosmotic flow to create force upon the object.

Figure 3B:
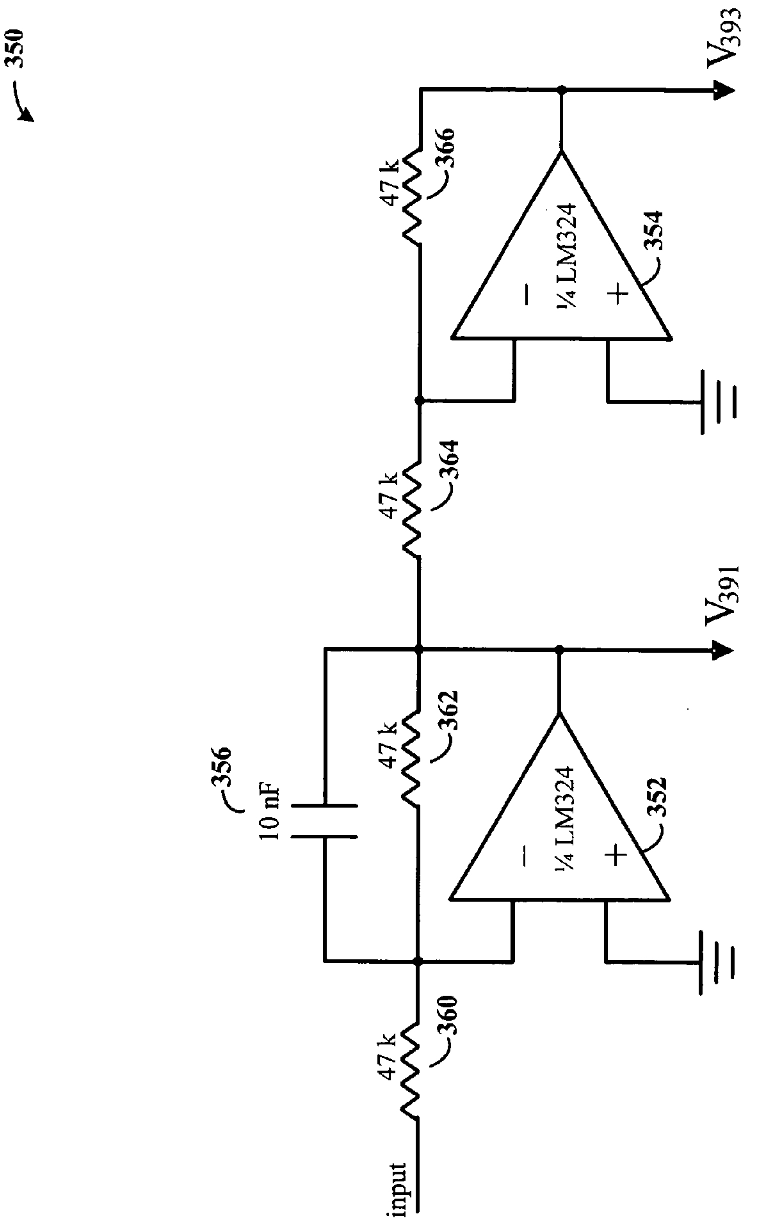
FIG. 3B shows an electronic circuit for applying equal and opposite voltages to pairs of opposing electrodes, according to another example embodiment of the present invention.

FIG. 3B shows an electronic circuit 350 for applying equal and opposite voltages to pairs of opposing electrodes, according to another example embodiment of the present invention. A pair of operational amplifiers (op amps) 352 and 354 are coupled respectively with outputs corresponding to analog voltage outputs $V_{391}$ and $V_{393}$. The feedback circuit 350 also includes four resistors 360, 362, 364 and 366, each at 47 kΩ, and one capacitor 356 at 10 nF. The circuit 350 is applicable for use with the electrophoretic trapping arrangement 200 shown in FIG. 2. The circuit 350 is implemented to apply $\pm V_{out}$ (via $V_{391}$ and $V_{393}$) to opposing electrodes, where $V_{out}$ is the voltage generated by a computer or other processor providing a feedback signal to the circuit 350. For instance, when implemented with the feedback circuit 320 in FIG. 3A, $V_{out}$ is the feedback voltage generated by the computer 330. In applications such as that shown in FIG. 2, the voltage drop ($V_{out}$) across is applied across electrodes at a distance of about 20 μm, facilitating a feedback voltage less than about 10V.

Referring again to FIG. 3A, and implementing the circuit 350 of FIG. 3B, the computer 330 is programmed to facilitate the analysis of particles as follows, in connection with another example embodiment of the present invention. The computer 330 acquires images as they stream in from the optical detector 312 and processes the images in real-time to extract the "X" and "Y" coordinates of a single nanoparticle in the trapping region (e.g., region 240 of FIG. 2). The computer 330 displays an image of the trapping region on its monitor, highlighting the trapped particle, and accepts user inputs, such as from a mouse or other input device, indicating a desired motion of the target location or to direct the trapping to a different particle. In response to the user inputs and/or to automatically generated control signals (e.g., for mitigating Brownian motion), the computer 330 calculates feedback voltages and sends them to the circuit 350. The computer 330 also records and saves video images, the trajectory of trapped particles and the applied feedback voltage.

In some applications, the optical detector 312 and computer 330 acquire (capture) images of a sub-micron object at a video frame rate, with subsequent images captured at the video frame rate. The computer 330 and feedback circuit 320 work to adjust an electrokinetic force applied to the sub-micron object as a function of the video frame rate and of motion detected in response to the captured images.

In a separate application, for example, the computer 330 acquires an image, processes the image to extract the "X" and "Y" coordinates and calculates a feedback voltage in less than about 3.4 ms, which is commensurate with an interval between video frames from the optical detector 312. This approach facilitates the trapping of particles, using feedback to mitigate particle motion at a rapid pace. Furthermore, by repeatedly capturing images at a relatively fast video frame rate, the images can be processed to detect motion of a particle in the image and to provide a feedback voltage at a rate that is highly responsive to movement, facilitating trapping and/or manipulation of the particle.

The computer 330 implements a variety of hardware and/or software, and is programmed accordingly in a variety of manners, depending upon the available equipment and application in which particles are trapped.

In one implementation, auxiliary software is implemented to quantify the feedback latency of the arrangement 300 for any set of software parameters. An LED under computer control is pointed at the optical detector 312. The computer briefly flashes the LED, and then records how long it takes for the optical detector 312 and any corresponding image-processing software to register the flash. This feedback latency can be used to control the application of the feedback voltage via the feedback circuit 350 in FIG. 3B.

In another implementation, the speed of the image processing is enhanced with the following approach. A small sub-image (e.g., 15×15 pixels) is extracted from a raw image from a camera implemented as the optical detector 312. This sub-image is chosen to be small enough to contain on average only one particle, but large enough so that, if the particle is in the center of the sub-image during one frame, the particle is unlikely to have left the sub-image entirely in a subsequent camera image frame.

In the first step of image processing, a background image is subtracted from the sub-image. The background image is constructed by averaging many (e.g., 10 to 1000) video frames. The background subtraction is useful for removing signal from scattered laser light and from other unwanted signals. An optional flat-field correction then scales the intensity values in the sub-image based on the spatial distribution of laser intensity from the laser 314 (e.g., when the laser intensity is inhomogeneous over the field of view). The sub-image is then convolved with a Gaussian filter (e.g., with a 3×3 or 5×5 kernel), preserving real features while diminishing pixel noise. A threshold is applied to remove residual background, and the center of mass is calculated for the remaining pixels. The position of the center of mass of the image is then used to compute the required feedback voltages. The sub-image for the next frame is centered on the center of mass calculated for the preceding frame. With this approach, a single particle is tracked over many frames, even if there are multiple other particles in the large (original) image. Where two particles enter the sub-image simultaneously, their mutual center of mass is tracked until one of the particles exits the sub-image. In some applications, this approach is implemented using the IMAQ Vision library from National Instruments, which is implemented to perform the above operations in about 2.5 ms for a 32×32 pixel region of interest (ROI).

In another embodiment, the velocity of a particle being trapped is calculated by calculating the displacement over two recent image frames obtained by the optical detector 312. When the particle is desirably sped up, a force proportional to the velocity is added to give the particle momentum. The direction of the added force is thus selected to increase or decrease the apparent mass of the particle.

Referring again to FIG. 3A, in another example embodiment, the computer 330 is programmed to respond to user inputs by superimposing an AC or DC field on the feedback field. Fields (AC) with frequencies higher than the feedback bandwidth are selectively used to orient anisotropic particles in the microfluidic cell 305, or to measure their mobility as a function of frequency. With this approach, time- and frequency-dependent mobility of single particles can be measured. The time-resolved single-particle mobility measurements can be used to provide information on charge and conformational fluctuations within the particles. DC fields are implemented to cause particles to sweep through the field of view, which can be useful when searching for a specific type of particle, or if the particles are in a very dilute solution in which there may be few particles that cross the field of view.

Figure 3C:
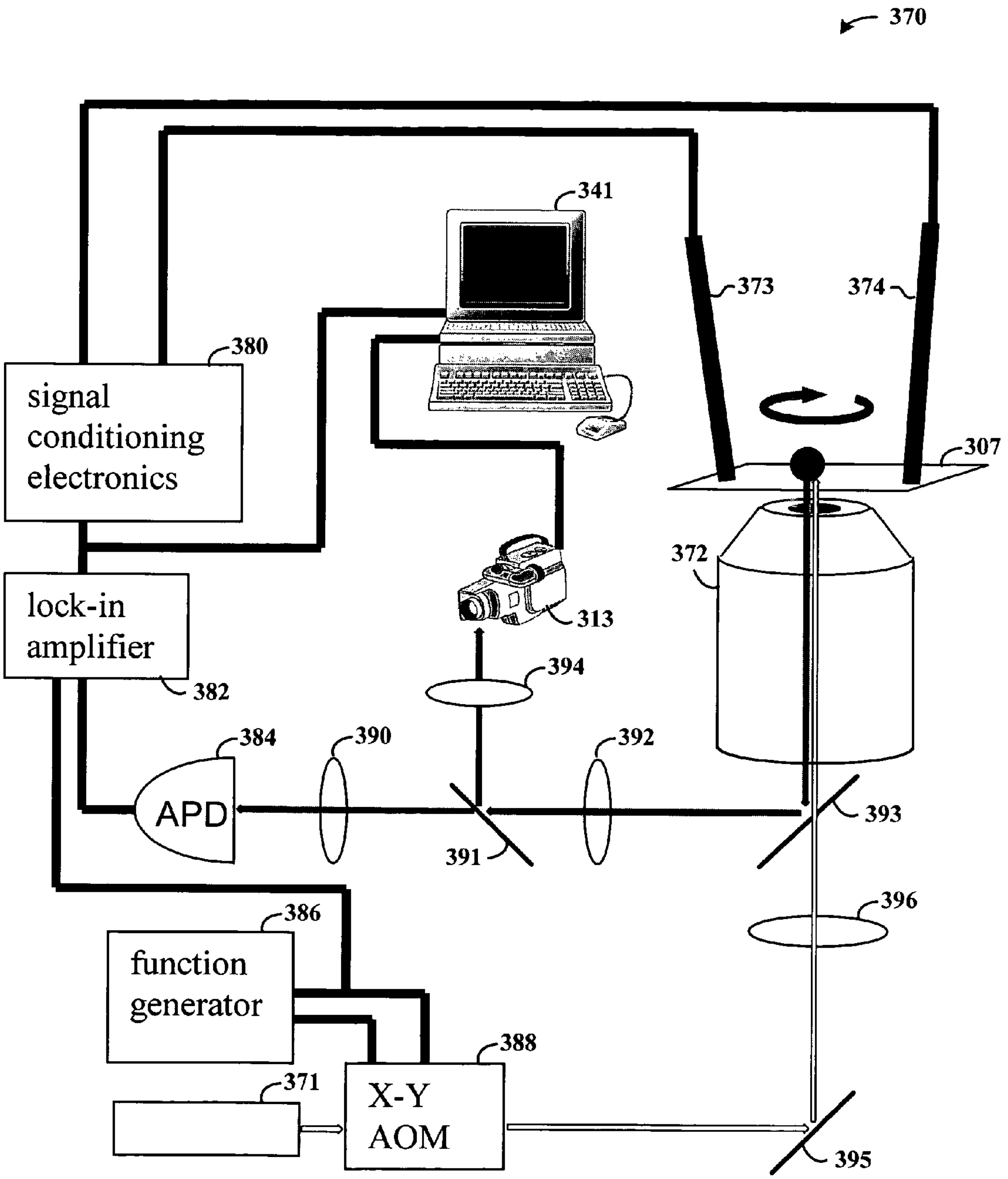
FIG. 3C shows an arrangement for analyzing particles using a microfluidic cell with a rotating laser approach, according to another example embodiment of the present invention.

FIG. 3C shows an arrangement 370 for analyzing particles using a microfluidic cell with a rotating laser approach, according to another example embodiment of the present invention. An acousto-optic modulator (AOM) 388, driven with a function generator 386, drives light from a laser 371 in a circle at a very high frequency (e.g., about 50 kHz), and to a microfluidic cell arrangement 307 via a mirror 395, lens 396, dichroic beam splitter 393 and microscope objective 372. Light from the microfluidic cell arrangement 307 is passed to a camera 313 via a lens 392, beam splitter 391 and lens 394. The camera provides a signal corresponding to the light received from the microfluidic cell arrangement 307 to a computer 341 which generates an image of a particle in a trapping region of the microfluidic cell arrangement.

Light from the microfluidic cell arrangement 307 is also passed via a lens 390 to a feedback circuit arrangement including an avalanche photodiode (APD) 384, a lock-in amplifier 382 and signal conditioning electronics 380. The APD 384 collects fluorescence and the lock-in amplifier 382 compares the phase of the fluorescence fluctuations to the phase of the AOM drive signal to generate a feedback voltage to apply to electrodes 373 and 374 that facilitates trapping of the particle in the microfluidic cell arrangement 307. For instance, if an object to be trapped is in the center of the circle in which the laser light is scanned, the object will emit a constant stream of photons. However, if the object moves off-center, its emission is modulated at the rotation frequency of the laser beam. In this regard, the phase of the modulation of the detected photons is compared to the phase of the rotation of the laser using the lock-in amplifier 382. This comparison is used to determine the direction in which the object has moved, with a voltage being applied to the electrodes 373 and 374 (and additional electrodes, where appropriate) to counter the motion.

FIGS. 4A-4K show a cross-sectional view of a PDMS microfluidic trap mold arrangement at various stages of manufacture, according to another example embodiment of the present invention. The microfluidic trap mold arrangement shown in FIGS. 4A-4K may, for example, be implemented to fabricate a microfluidic trapping arrangement.

Figure 4A:
FIGS. 4A-4K show a cross-sectional view of a PDMS microfluidic trap mold arrangement at various stages of manufacture, according to another example embodiment of the present invention.
Figure 4B:
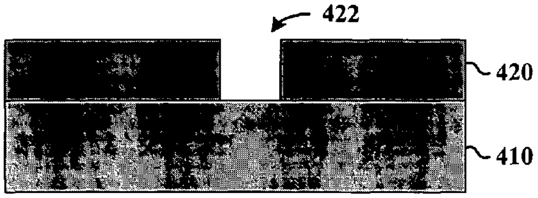
Figure 4C:
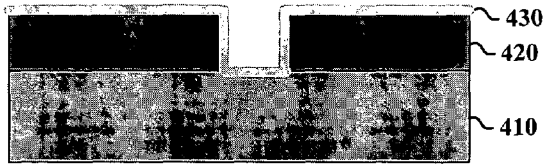
Figure 4D:
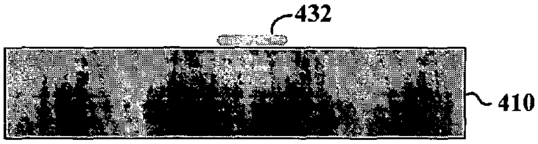
Figure 4E:
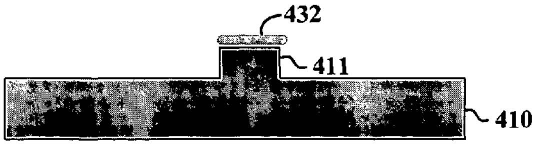
Figure 4F:
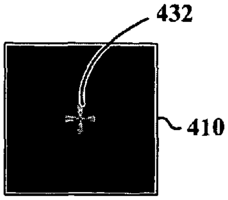

Beginning with FIG. 4A, a photoresist mask 420 is formed on a silicon substrate 410, and an opening 422 is formed in the mask as shown in FIG. 4B by standard lithography. In FIG. 4C, a layer 430 of aluminum (e.g., about 80 nm thick) is formed on the mask 420 and on the silicon substrate 410 in the opening 422. The mask layer 420 and portions of the aluminum layer 430 on the mask layer 420 are also removed, leaving a patterned portion 432 of the aluminum layer on the silicon substrate 410 as shown in FIG. 4D. The silicon substrate 410 is then further etched, such that a portion 411 of the silicon substrate covered by the patterned aluminum portion 432 extends above the substrate as shown in FIG. 4E. FIG. 4F shows a top-down view of the patterned portion 432.

Figure 4G:
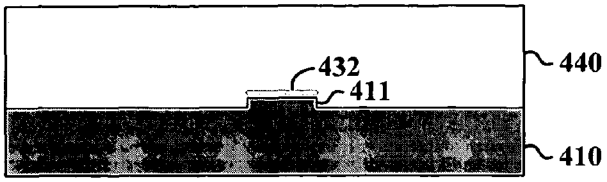
Figure 4H:
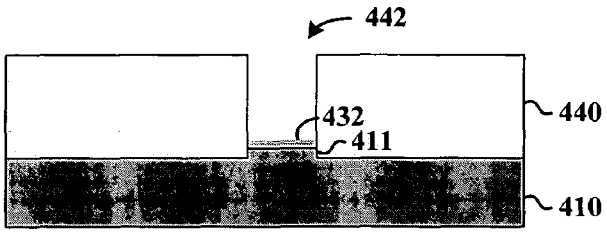
Figure 4I:
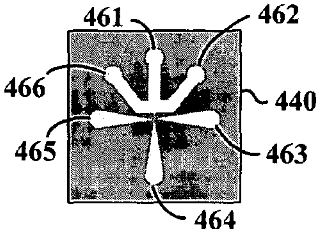

In FIG. 4G, a photoresist layer 440 (e.g., SU-8 2035) has been formed on the silicon substrate 410 and on the patterned portion 432 of the aluminum layer, with the photoresist further exposed to form an opening 442 therein, as shown in FIG. 4H. FIG. 4I shows a top-down view of the exposed photoresist layer 440, with microfluidic channel regions 461-466. The geometry in FIG. 4I is applicable, for example, to manufacturing the electroosmotic trapping arrangement 201 shown in FIG. 2B. Channel regions 466 and 462 are respectively implemented in the sample in and sample out regions shown in FIG. 2B. The number of microfluidic channels is selected to meet particular applications, and in some instances is selected to equalize hydrostatic pressure in active arms (e.g., arms in which electrodes are to be applied). Furthermore, the microfluidic channels are selectively implemented to mitigate or eliminate uncontrolled pressure-driven flows, and to deliver new chemicals while keeping an object trapped.

Figure 4J:
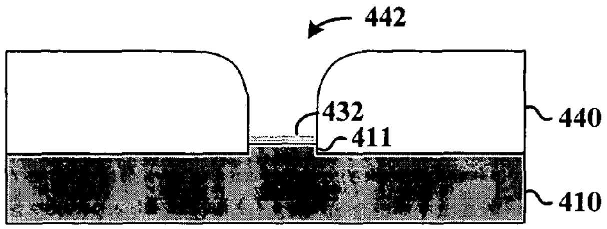
Figure 4K:
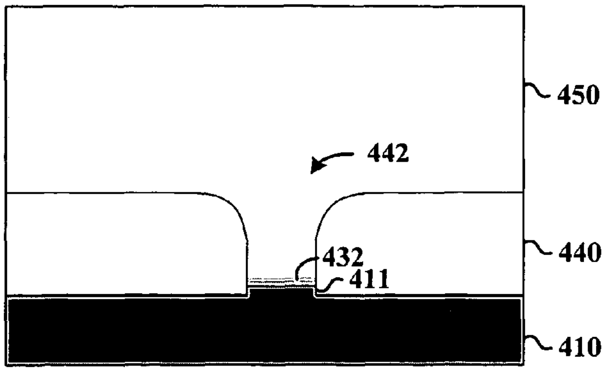

The arrangement shown in FIGS. 4H and 4I is hard-baked (e.g., at 150 degrees Celsius for about 2 hrs.) to strengthen the photoresist layer 440 and to round the corners thereof as shown in FIG. 4J. In FIG. 4K, a layer of PDMS 450 is formed on the baked photoresist layer 440 and on the patterned portion 432 of the aluminum in the opening 442. The rounded corners of the photoresist 440 facilitate a favorable draft angle for easy removal of the PDMS 450, for use in a microfluidic cell. In some applications, the arrangement shown in FIG. 4J is placed in a dessicator in vacuum with trichloro (1H,1H,2H, 2H perfluorooctyl) silane available from Aldrich (e.g., a drop thereof) for about 1 hr. prior to applying the PDMS layer 450 to facilitate removal of the PDMS from the mold.

Figure 5:
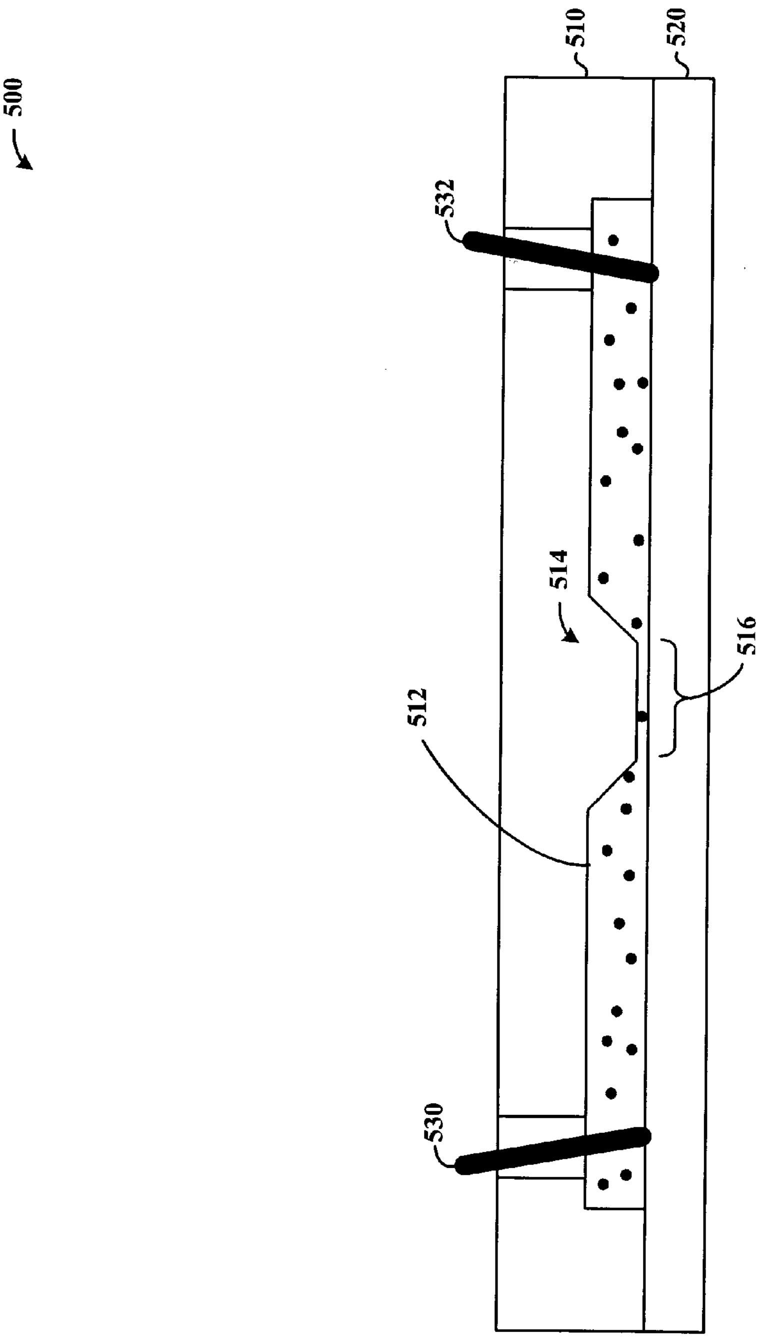
FIG. 5 is a cross-sectional view of a microfluidic trapping arrangement for trapping sub-micron particles in solution, according to another example embodiment of the present invention.

FIG. 5 is a cross-sectional view of a microfluidic trapping arrangement 500 for trapping sub-micron particles in solution, according to another example embodiment of the present invention. The trapping arrangement 500 includes a patterned channel arrangement 510 on a coverslip 520, with a channel region 512 remaining open between the patterned channel arrangement and the coverslip to accept fluid flow. The patterned channel arrangement 510 is formed using, for example, glass or PDMS, the latter of which is selectively manufactured using an approach such as that discussed in connection with FIGS. 4A-4K (e.g., with a lower portion 514 of PDMS extending as would be formed in a region similar to region 442 of FIG. 4K). The glass version of which is selectively manufactured using an approach such as that discussed in connection with FIGS. 7A-7L.

Control electrodes 530 and 532 are arranged to apply an electrokinetic force to solution-born particles in the channel region 512. Additional electrodes (e.g., four total as shown in FIG. 3C) are also arranged extending into the channel region 512. Voltage applied to each electrode facilitates the trapping of particles in a trapping region 516 of the channel region 512, below the lower portion 514 of the patterned channel arrangement 510.

The relatively thin trapping region 516 facilitates the confinement of trapped objects to the focal plane of a microscope used to image the particles. Further, the relatively thicker portions of the channel region 512 connecting the trapping region to the electrodes 530 and 532 mitigates (e.g., reduces or eliminates) resistive losses in these channels and allows the channels to fill easily.

In one implementation, the patterned channel arrangement 510 is made of PDMS and is irreversibly bonded to the coverslip 520 by exposure to a plasma of low-pressure room air for about one minute. The plasma treatment is further implemented to make the PDMS surfaces hydrophilic and negatively charged, which leads to strong electroosmotic flow.

In another implementation, the cross-sectional area of the trapping region 516 is about 800 times smaller than the cross-sectional area of the channel region 512 connecting to the electrodes 530 and 532 (and others, as appropriate). With this approach, slight flows in the channel region 512 leads to very large flow velocities in the trapping region. In certain applications, the pressure in the channel region 512 is balanced by immersing the entire cell in a water bath as shown, for example, in FIG. 6.

In another example embodiment, four electrodes (e.g., microfabricated gold) are introduced to the trapping region 516 to facilitate the application of high-frequency AC fields thereto. These electrodes may be in addition to the electrodes 530 and 532 (or, as applicable to FIG. 2, electrodes 210, 212, 214 and 216). The additional electrodes in the trapping region 516 facilitate the trapping, stretching and/or orientation of particles such as DNA.

Figure 6:
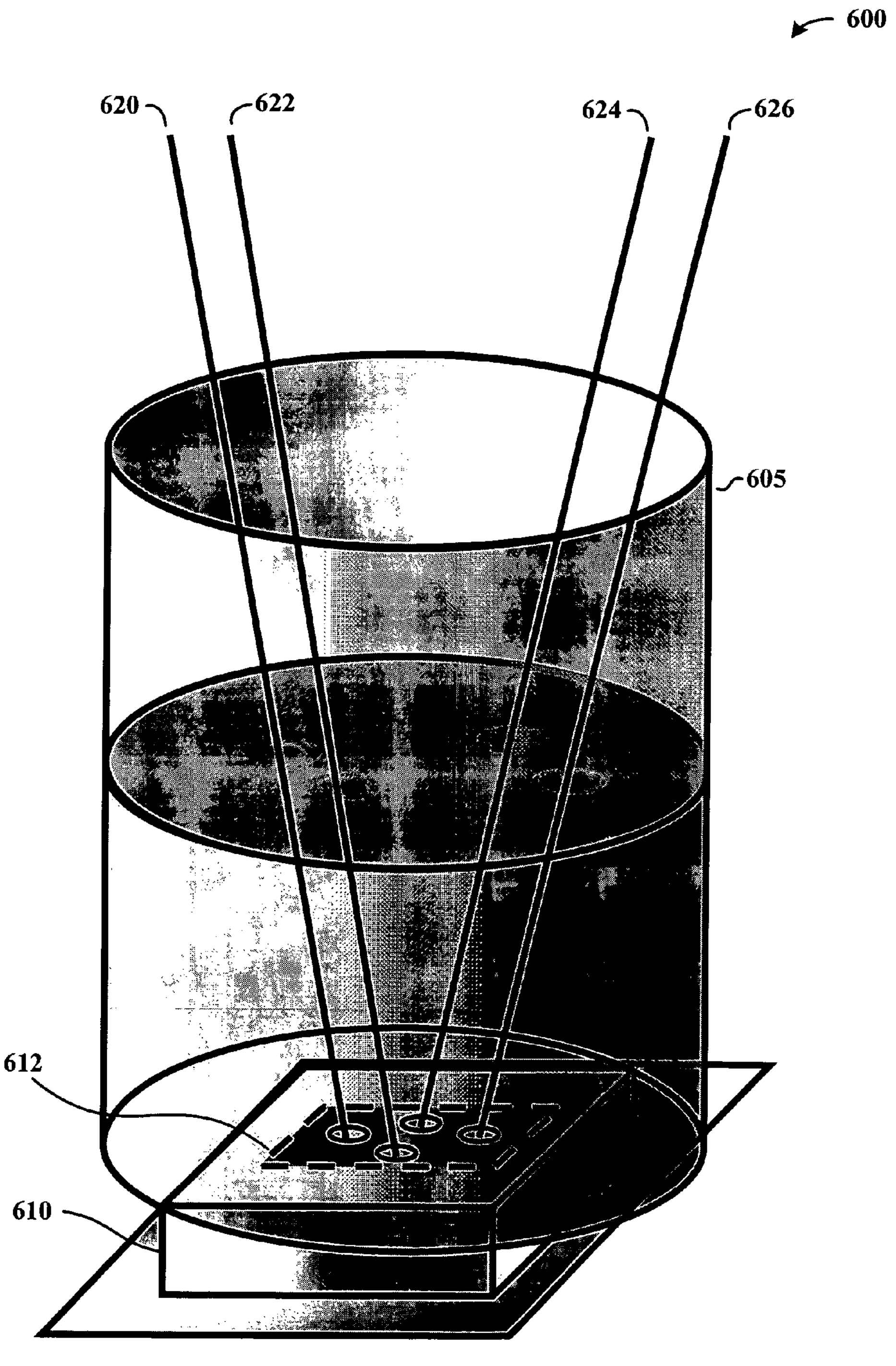
FIG. 6 shows an electrophoretic trapping arrangement for trapping particles in solution, according to another example embodiment of the present invention.

FIG. 6 shows an electrophoretic trapping arrangement 600 for trapping particles in solution, according to another example embodiment of the present invention. The trapping arrangement 600 may, for example, be used in connection with the microfluidic cell 305 in the arrangement 300 shown in FIG. 3A. The trapping arrangement 600 includes a fluid container 605 with a sample cell 610 epoxied to the bottom of the fluid container. Access holes are punched through the bottom of the container and through a channel arrangement 612 of the sample cell 610. Electrodes 620, 622, 624 and 626 (e.g., insulated copper wires) are coupled into the sample cell 610 in microfluidic channels therein. The sample cell 610 is filled with a solution of objects to be trapped by pipetting. Excess buffer is then added to the fluid container 605 to equalize the pressure in all arms of the sample cell. In some applications, the microfluidic trapping arrangement 500 is used as the sample cell 610, with a PDMS channel arrangement 612.

In another example embodiment, fluid flow is used to manipulate, or translate, particles in solution. Feedback and control of fluid flow is effected in a manner similar to that described in connection with FIGS. 3A-3C, with fluid flow generated to manipulate particles using, e.g., electromechanical and/or electrokinetic arrangements. In this regard, an output from a feedback circuit such as that shown in FIG. 3B is used to control the flow rate and direction of fluid, rather than controlling an electric field as described above. With this approach, viscous drag interacts with all particles, such that neutral particles may also be trapped; furthermore, the ability to trap a particle is independent of the ionic strength or chemical composition of the host fluid.

In one implementation, fluid flow is implemented with an electroosmosis approach, wherein the flow of a liquid in a small capillary (or other fluid passageway) is effected when a voltage is applied to the capillary. The electroosmotic flow imparts a force that can move objects in a trapping region. The magnitude of the electroosmotic flow is controlled by adjusting the surface chemistry of the channels. In some applications, glass channels are used to achieve a relatively strong electroosmotic flow. In other applications, a polymer coating is used to suppress electroosmotic flow (e.g., and to trap only charged objects).

Figure 7A:
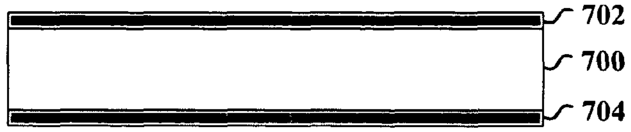
FIGS. 7A-7L show a cross-sectional view of a microfluidic trap arrangement at various stages of manufacture, according to another example embodiment of the present invention.
Figure 7B:
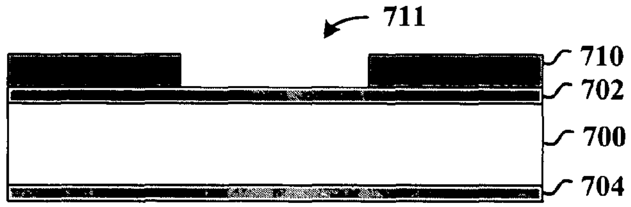
Figure 7C:
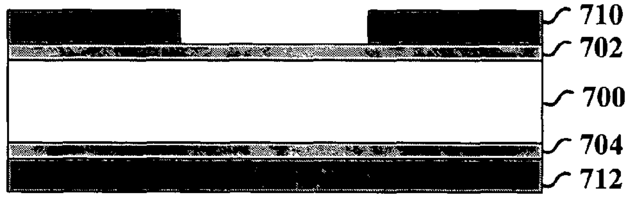
Figure 7D:
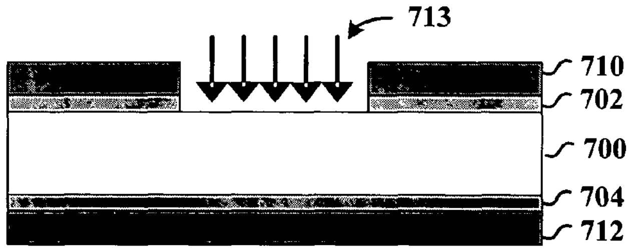
Figure 7E:
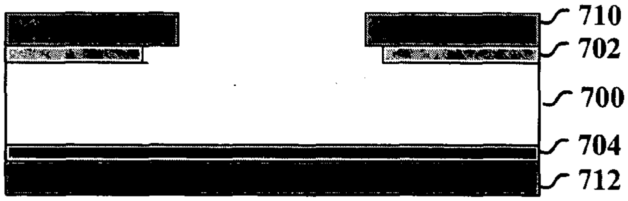
Figure 7F:
Figure 7G:
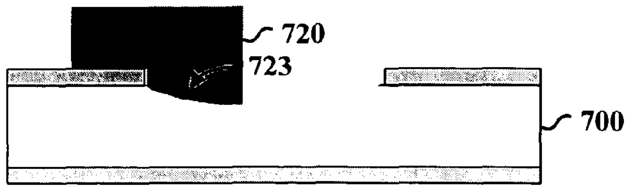
Figure 7H:
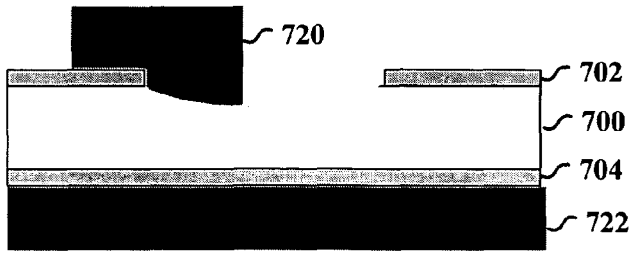
Figure 7I:
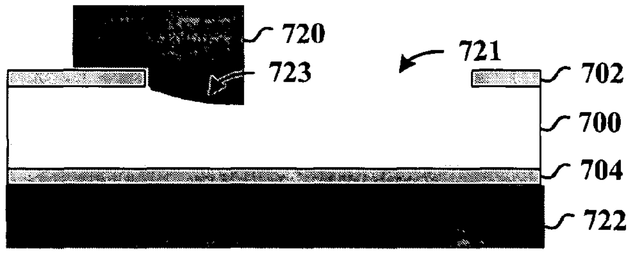
Figure 7J:
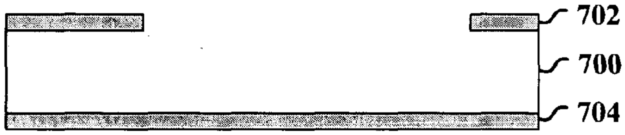
Figure 7K:
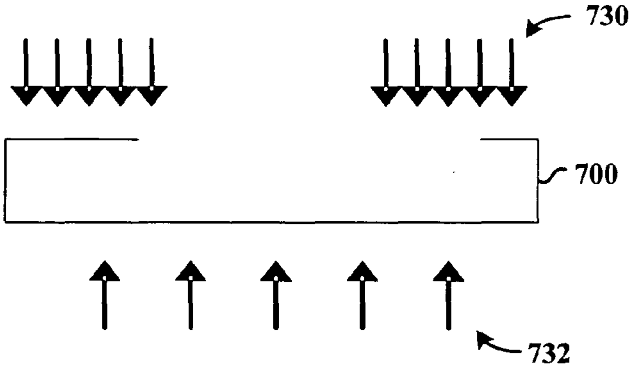
Figure 7L:
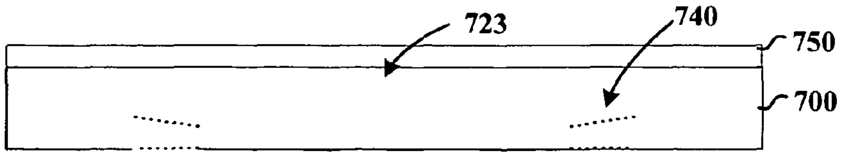

FIGS. 7A-7L show a cross-sectional view of a microfluidic trap arrangement at various stages of manufacture, according to another example embodiment of the present invention. Beginning with FIG. 7A, a glass wafer 700 has been cleaned (e.g., in a solution of about 80% Conc. $H_2SO_4$, 20% $H_2O_2$) and coated with about 100 nm of silicon 702 and 704 at each side of the wafer via chemical vapor deposition (CVD). In FIG. 7B, the front side of the wafer 700 (the top of the wafer) has been coated with a photoresist layer 710 at about 1.6 gm of thickness using an HMDS prime followed by a spin-coat and soft-bake. The photoresist layer 710 has been exposed and developed to leave the resulting opening 711. In FIG. 7C, the back side of the wafer 700 has been coated with a protection photoresist layer 712 at a thickness of about 1.6 μm, with the wafer given a hard-bake of about 115 degrees Celsius for about 5 minutes.

In FIG. 7D, the front of the wafer 700 has been exposed to a reactive-ion etch (RIE, represented by arrows 713) to remove the silicon exposed as shown in FIG. 7C. In FIG. 7E, the wafer 700 has been immersed in an etching solution (e.g., 49% HF for about three minutes), with the silicon and photoresist acting as a double-layer etch mask. In FIG. 7F, the wafer 700 has been thoroughly rinsed in clean water and dried, with the photoresist 710 and 712 having been stripped from the wafer.

In FIG. 7G, the front of the wafer 700 has been coated with about 18 μm of photoresist, which has been exposed and developed, leaving about a 120 μm circle of resist 720 over a trapping region 723 and channels in the immediate vicinity. In FIG. 7H, the back of the wafer 700 has been coated with a photoresist layer 722 at about 18 μm in thickness, followed by a hard bake. In FIG. 7I, the wafer 700 has been etched in about 49% HF for 10 minutes, such that the depth of channel regions 721 are about 80 μm, and the depth of the channels leading to the trapping region 723 is about 24 μm (using the isotropic nature of the etch to generally inhibit the lateral etching of areas under the photoresist 720).

In FIG. 7J, the wafer 700 has been rinsed in clean water and the photoresist 720 and 722 stripped from the wafer. In FIG. 7K, both sides of the wafer 700 have been exposed to another RIE polymer descum followed by a silicon etch (represented by arrows 730 and 732) to remove the silicon 702 and 704 from the wafer. In FIG. 7L, a larger view of the wafer 700 is shown, with an adjacent channel feeding the trapping region 723 shown (with the resulting trapping region corresponding, for example, to trapping region 516 in FIG. 5). The front of the wafer 700 (now-transparent) has been coated with a protection layer of about 7 gm of photoresist, with about 0.7 mm holes opened in electrode ports for the channels (shown by region 740), and the protection layer of photoresist removed with acetone after the opening of the electrode ports (and, where appropriate, the separation of individual portions of the wafer 700). The wafer 700 in FIG. 7L has also been coupled to a piece of glass 750 on the upper portion of the wafer.

In another example embodiment of the present invention, a three-dimensional trapping approach is implemented for trapping sub-micron particles in solution and, where appropriate, manipulating the trapped particles. A set of non-planar electrodes is implemented to facilitate manipulation in three dimensions, with various numbers of electrodes (and arrangements thereof) implemented to fit particular applications. For instance, various implemented electrode arrangements include four electrodes on the vertices of a tetrahedron, five electrodes on the vertices of a triangular dipyramid (i.e., two tetrahedra back-to-back), six electrodes on the vertices of an octahedron or triangular prism, and eight electrodes reaching to the corners of a cube.

In each three-dimensional arrangement, an optical imaging system is adapted to monitor the motion of a particle tracked in three dimensions, with a feedback circuit used to apply electric fields to one or more of the electrodes to achieve manipulation of the particle in three dimensions. The manipulation is achieved in a manner similar to that described above in connection with the use of four electrodes, with particular control applications implemented specifically for the number and arrangement of electrodes used and the three-dimensional tracking approach. The electrodes facilitate the mitigation of motion, or a desired manipulation, of a particle in a third dimension.

One approach to three-dimensional particle tracking involves out-of-focus imaging. The shape of a particle's image changes when the particle moves in a direction that is generally perpendicular to the focal plane of an imaging system. The measured image shape is compared to known reference shapes (created from particles with known out of plane displacements), and the out of plane displacement of the particle is selectively inferred from the comparison.

Another approach to three-dimensional particle manipulation involves evanescent wave imaging. When light impinges on an interface at an angle that is above the critical angle for total internal reflection of a particle, an evanescent field is created on the far side of the interface. The intensity of this evanescent field decays exponentially with distance from the interface. If a fluorescent object is placed near the interface and is excited by the evanescent field, its fluorescence intensity also decreases exponentially with its distance from the interface. Using these characteristics of the evanescent field as relative to fluorescent objects, the fluorescence intensity of a particle is used to provide an indication of the distance of the object from the interface. This indication of distance is used in tracking and manipulating the particle. For general information regarding three-dimensional approaches, and for specific information regarding three-dimensional approaches that are selectively implemented with one or more example embodiments of the present invention, reference can be made to R. M. Dickson, D. J. Norris, Y-L. Tzeng, and W. E. Moerner, "Three-Dimensional Imaging of Single Molecules Solvated in Pores of Poly(acrylamide) Gels," *Science* 274, 966 (1996).

In another example embodiment of the present invention, biological molecules are trapped using an approach involving a lipid membrane. The lipid membrane is used, for example, in place of a channel arrangement such as a PDMS arrangement described above. The biological molecules are embedded in, or tethered to, the lipid membrane. The biological molecules are then free to diffuse within the plane of the lipid membrane, but are unable to move in the perpendicular direction. An electrophoretic electrode arrangement, such as that shown in FIG. 2A or 2B, is used to trap the biological molecules.

In another example embodiment, trapped particles are assembled into a manufactured product using one or more of the approaches discussed herein to trap the particles and, where appropriate, manipulate the particles. For example, proteins, DNA, and viruses can be trapped and manipulated without necessarily damaging them or removing them from their native environments (i.e., in solution).

In certain applications, hybrid biological/nanotechnological devices are manufactured. This approach is facilitated, for example, by moving a platform containing the electrode pattern above a surface (or at a desired level) to bring trapped objects to desired positions on the surface. Such trapped objects include, for example, biomolecular motors or biomolecular enzymes needed to perform a specific function.

In another example embodiment, trapped particles are subsequently fixed in position. The particles are trapped in a photopolymerizable medium (i.e., a medium that can be converted from a liquid to a solid by an intense pulse of light or other suitable approach). Particles are first trapped in the liquid polymer using an approach such as that described herein, and where appropriate, manipulated to a desired position. The trapped particle is then fixed in position, such as by applying an intense pulse of ultraviolet light to the trapped particle, polymerizing the medium immediately around it and immobilizing the particle. Photopolymerizable polymers that may be used for this trapping approach include polyurethane, poly-(methyl methacrylate), 4-hydroxybutyl acrylate (4-HBA) and SU-8.

A variety of particles are trapped using one or more of the approaches described herein, in connection with various example embodiments. In one example embodiment, DNA is trapped using the following approach. Lambda phage-DNA is dissolved in a buffer of 10 mM Tris-HCl, 10 mM NaCl, and 1 mM EDTA at a pH of 8.0. A fluorescent dye such as YOYO-1 is added at a concentration of about 1:10 (dye:base pairs of DNA) and the mixture is incubated at room temperature in the dark for about 30 min. An oxygen scavenger system of glucose (4.5 mg/mL), glucose oxidase (0.43 mg/mL), catalase (72 microg/mL), and beta-mercaptoethanol (5 microL/mL) is added to the solution to mitigate and/or prevent photobleaching. An anti-adsorption polymer (available from Applied Biosystems) is added at a concentration of 10% to mitigate or prevent the sticking of DNA to the walls of the cell. The molecules are excited by light with a wavelength of 488 nm and electrokinetically trapped and manipulated for analysis.

In another example embodiment, the tobacco mosaic virus (TMV) is trapped and analyzed. Particles of TMV (American Type Culture Collection) are suspended at a concentration of 50 nM in a buffer of 0.1 M $NaHCO_3$ (pH 8.0). The particles are incubated with 1 mM Cy3-succinimidyl ester (Molecular Probes) at 4° C. for 48 hrs for labeling of exposed amines. Unreacted dye is removed by gel filtration, which is followed by dialysis against distilled water. The TMV is placed in a solution of distilled water at a TMV concentration of 20 pM, excited by light with a wavelength of 532 nm, trapped and, where appropriate, manipulated using an electrokinetic approach as described herein.

The protein GroEL is trapped and/or manipulated in accordance with another example embodiment of the present invention. GroEL is fluorescently labeled at exposed amines with an average of 6 molecules of Cy3-succinimidyl ester (Molecular Probes) per tetradecamer of GroEL. A solution of 20 pM GroEL is dissolved in a buffer of 1 mM DTT, 50 mM Tris-HCl, 50 mM KCl, and 5 mM $MgCl_2$ at a pH of 7.4, and an equal volume of glycerol is added to increase the viscosity. The molecules were excited with light at a wavelength of 532 nm, trapped and, where appropriate, manipulated as discussed herein.

According to another example embodiment, B-phycoerythrin is trapped and/or manipulated using an electrokinetic approach. B-phycoerythrin is dialyzed against a buffer of 100 mM phosphate and 100 mM NaCl at a pH of 7.4. Prior to trapping, the B-phycoerythrin solution is mixed with an equal volume of glycerol, with 1 mg/mL Bovine Serum Albumin added to prevent adsorption. The B-phycoerythrin molecules are excited with light at a wavelength of 532 nm and trapped or manipulated using one or more of the various approaches described herein.

In still another example embodiment, CdSe nanocrystals are trapped. Streptavidin-coated nanocrystals (e.g., QD565 available from Quantum Dot Corporation of Hayward, Calif.) are dissolved to a concentration of 20 pM in a solution of 47% distilled water, 48% glycerol, 4% beta-mercaptoethanol, and 1% an anti-adsorption polymer (e.g., available from Applied Biosystems). The quantum dots are pumped (excited) with a laser at a wavelength of 488 nm, and trapped or manipulated using one or more of the various approaches described herein.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, various approaches discussed in connection with electrophoresis may be implemented with electroosmosis, and vice-versa. In addition, approaches discussed in connection with an electrophoretic or electroosmotic approach may selectively be implemented with both electrophoresis and electroosmosis. Moreover, while various approaches are discussed in the context of sub-micron or nano-scale objects, particles or molecules, the approaches discussed herein may be applied to smaller or larger-scale objects, particles or molecules. Such modifications and changes do not depart from the true spirit and scope of the present invention, including that set forth in the following claims.

What is claimed is:

1. A method for controlling a fluid-born sub-micron object, the method comprising:

detecting positional information for the sub-micron object at different times;

capturing images at a video frame rate by performing steps including:

averaging a multitude of captured images and, in response thereto, constructing a background image from the captured images, extracting a sub-image from a captured image of the sub-micron object, the sub-image being smaller than the captured image and including an image of the sub-micron object, subtracting the constructed background image from the sub-image, calculating the center of mass for the sub-micron object in the sub-image, and for a subsequent captured image of the sub-micron object, re-centering the location of a subsequent sub-image to be taken of the subsequent image as a function of the calculated center of mass of the sub-micron object, and extracting a subsequent sub-image from the subsequent image at the re-centered location;

repeatedly detecting motion from the captured images, and a directional component thereof, of the sub-micron object as a function of the detected positional information at each different time; and applying an electrokinetic force to the sub-micron object as a function of the video frame rate and a directional component of the electrokinetic force that is responsive to and in opposition to the determined directional component of the repeatedly detected motion of the sub-micron object, thereby mitigating motion of the sub-micron object.

2. A method for controlling a fluid-born sub-micron object, the method comprising:

detecting positional information for the sub-micron object at different times;

detecting motion, and a directional component thereof, of the sub-micron object as a function of the detected positional information at each different time, and including detecting three-dimensional motion of the sub-micron object;

positioning the sub-micron object by applying an electrokinetic force to the sub-micron object as a function of a directional component of the electrokinetic force that is responsive to and in opposition to the determined directional component of the motion of the sub-micron object, and including applying an electrokinetic force to mitigate the detected motion of the sub-micron object, thereby mitigating motion of the sub-micron object; and in response to positioning the sub-micron object, applying a pulse of ultra-violet light to the sub-micron object to polymerize the fluid immediately around the sub-micron object, the fluid being a photopolymerizable polymer.

3. The method of claim 2, wherein detecting positional information for the sub-micron object includes out-of-focus imaging to determine out of plane displacement.

4. The method of claim 2, wherein detecting positional information for the sub-micron object includes evanescent wave imaging.

5. A method for controlling a fluid-born sub-micron object, the method comprising:

detecting positional information for the sub-micron object at different times;

detecting motion, and a directional component thereof, of the sub-micron object as a function of the detected positional information at each different time, and including applying circular rotating laser light to a trapping region of a microfluidic cell containing the sub-micron object, detecting light from the trapping region over time, and comparing the phase of fluorescence fluctuations in the detected light to the phase of the applied rotating laser light; and applying an electrokinetic force to the sub-micron object as a function of a directional component of the electrokinetic force that is responsive to and in opposition to the determined directional component of the motion of the sub-micron object, wherein applying an electrokinetic force includes applying the electrokinetic force also as a function of the comparison.

6. The method of claim 5, wherein comparing the phase of fluorescence fluctuations in the detected light to the phase of the applied rotating laser light includes detecting that the sub-micron object is in the center of the circle in which the laser light is applied by detecting a constant stream of photons from the sub-micron object, and detecting that the sub-micron object is off-center, relative to the circle in which the laser light is applied, by detecting photons from the sub-micron object that are modulated at the rotation frequency of the laser beam.

7. A method for controlling a fluid-born sub-micron object, the method comprising:

detecting motion of the sub-micron object by applying circular rotating laser light to a trapping region of a microfluidic cell containing the sub-micron object, detecting light from the trapping region over time, and comparing a phase of fluorescence fluctuations in the detected light to a phase of the applied rotating laser light; and applying an electrokinetic force to the sub-micron object as a function of the detected motion, thereby mitigating motion of the sub-micron object within the trapping region.

8. The method of claim 7, wherein comparing the phase of fluorescence fluctuations in the detected light to the phase of the applied rotating laser light includes detecting that the sub-micron object is in a center of a circle created by the circular rotating laser light by detecting a stream of photons from the sub-micron object, and detecting that the sub-micron object is off-center, relative to the circle in which the laser light is applied, by detecting photons from the sub-micron object that are modulated at a rotation frequency of the laser beam.

9. The method of claim 7, wherein applying an electrokinetic force to the sub-micron object includes modifying a direction of an applied electrokinetic force in response to detecting that the sub-micron object has moved within the trapped location.

10. The method of claim 7, wherein applying an electrokinetic force to the sub-micron object further includes, determining a desired direction for the electrokinetic force, within the microfluidic cell, as a function of the detected motion; and modifying, in response to the desired direction, electrical voltages provided to a plurality of electrodes that control the direction of the electrokinetic force within the microfluidic cell.

* * * * *